(12) United States Patent
Williams et al.

(10) Patent No.: US 11,794,691 B2
(45) Date of Patent: Oct. 24, 2023

(54) VEHICLES AND VEHICLE SYSTEMS FOR OPERATING POWERED DOOR LOCKS IN AN ALARM DETERRENT MODE

(71) Applicant: Toyota Motor Engineering & Manufacturing North America, Inc., Plano, TX (US)

(72) Inventors: Clinton Williams, Saline, MI (US); Alexander L. Paradis, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/494,403

(22) Filed: Oct. 5, 2021

(65) Prior Publication Data
US 2023/0103338 A1 Apr. 6, 2023

(51) Int. Cl.
*B60R 25/01* (2013.01)
*E05B 81/64* (2014.01)
*B60R 25/20* (2013.01)
*G08B 15/00* (2006.01)
*B60R 25/10* (2013.01)
*E05B 81/56* (2014.01)

(52) U.S. Cl.
CPC .......... *B60R 25/01* (2013.01); *B60R 25/1001* (2013.01); *B60R 25/20* (2013.01); *E05B 81/56* (2013.01); *E05B 81/64* (2013.01); *G08B 15/008* (2013.01)

(58) Field of Classification Search
CPC ..... B60R 25/01; B60R 25/1001; B60R 25/20; E05B 81/56; E05B 81/64; G08B 15/00; G08B 15/008
See application file for complete search history.

(56) References Cited

U.S. PATENT DOCUMENTS

| | | | |
|---|---|---|---|
| 5,334,969 A | 8/1994 | Abe et al. | |
| 5,602,426 A * | 2/1997 | Ecker | B60R 25/20 340/5.31 |
| 5,926,086 A * | 7/1999 | Escareno | B60R 25/33 340/426.21 |
| 6,100,792 A * | 8/2000 | Ogino | B60R 25/1001 701/32.7 |
| 7,598,847 B2 | 10/2009 | Suzuki et al. | |
| 9,747,795 B1 * | 8/2017 | Espinosa | G08B 15/00 |
| 11,308,333 B1 * | 4/2022 | Langford | G06V 20/52 |

(Continued)

FOREIGN PATENT DOCUMENTS

JP 2005225437 A 8/2005

OTHER PUBLICATIONS

Sentry Mode: Guarding Your Tesla (https://www.tesla.com/blog/sentry-modeguarding-your-tesla), published Feb. 13, 2019, 2 pages.

*Primary Examiner* — Brian E Miller
(74) *Attorney, Agent, or Firm* — Dinsmore & Shohl LLP (57) ABSTRACT

A vehicle including powered door locks, a motor for positioning the powered door locks between a locked position and an unlocked position, one or more sensors for detecting an unauthorized event around the vehicle, and a controller configured to operate the motor to repeatedly move the powered door locks in a predetermined pattern based on speed in response to the one or more sensors detecting an unauthorized event around the vehicle.

20 Claims, 6 Drawing Sheets

(56) References Cited

U.S. PATENT DOCUMENTS

| | | | |
|---|---|---|---|
| 2004/0113760 A1* | 6/2004 | Tanaka | B60R 25/021 |
| | | | 701/45 |
| 2006/0001317 A1 | 1/2006 | Chen et al. | |
| 2010/0085171 A1* | 4/2010 | Do | G08B 25/10 |
| | | | 348/148 |
| 2017/0249792 A1* | 8/2017 | Gennermann | B60R 25/01 |
| 2017/0337790 A1* | 11/2017 | Gordon-Carroll | H04L 67/12 |
| 2018/0236972 A1 | 8/2018 | Linden et al. | |
| 2019/0357041 A1* | 11/2019 | Nishiyama | B60R 25/003 |
| 2020/0384948 A1 | 12/2020 | Toyooka et al. | |
| 2022/0017044 A1* | 1/2022 | Bielby | G06V 20/59 |

* cited by examiner

VEHICLES AND VEHICLE SYSTEMS FOR OPERATING POWERED DOOR LOCKS IN AN ALARM DETERRENT MODE

TECHNICAL FIELD

The present specification generally relates to vehicle alarm systems for deterring theft activity and, more specifically, powered door locks configured to operate in a predetermined pattern to deter detected theft activity around a vehicle.

BACKGROUND

Vehicle alarm systems may be configured to detect theft activity and initiate an alarm routine such as, for example, activating a horn and lights of the vehicle to alert others of the detected theft activity. However, these vehicle alarm systems do not operate in a first mode configured to provide a first set of alarm actions when a first level of theft activity is detected and subsequently operate in a second mode configured to provide a different second set of alarm actions when a second level of theft activity is detected. Furthermore, these vehicle alarm systems are restricted to operating only certain vehicle components in a limited manner.

Accordingly, a need exists for improved vehicle alarm systems that can operate in an initial deterrent mode based on the level of theft activity detected and control a wide variety of vehicle components in a unique manner directed at deterring the theft activity.

SUMMARY

In one embodiment, a vehicle includes powered door locks, a motor for positioning the powered door locks between a locked position and an unlocked position, a sensor configured to capture data of activity around the vehicle, and an electronic control unit configured to process the data captured by the sensor to detect an unauthorized event around the vehicle, and operate the motor to repeatedly move the powered door locks in a predetermined pattern based on speed in response to detecting an unauthorized event around the vehicle.

In another embodiment, an electronic control unit of a vehicle is configured to process data captured by a sensor to detect an unauthorized event around a vehicle, and operate a motor of the vehicle to repeatedly move powered door locks of the vehicle in a predetermined pattern based on speed in response to detecting an unauthorized event around the vehicle.

In yet another embodiment, a method includes detecting an unauthorized event around a vehicle, and in response to detecting the unauthorized event around the vehicle, operating a motor to repeatedly move powered door locks in a predetermined pattern based on speed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicles and vehicle systems including an alarm device configured to operate in either a deterrent mode or a normal mode based on a level of an unauthorized event detected around the vehicle.

The vehicle includes a vehicle component such as, for example, powered door locks, a motor for positioning the vehicle component between a locked position and an unlocked position, one or more sensors for detecting an unauthorized event around the vehicle, and a controller configured to operate the motor to repeatedly move the vehicle component in a predetermined pattern based on speed in response to the one or more sensors detecting an unauthorized event around the vehicle. Various embodiments of the vehicle and the operation of the vehicle are described in more detail herein. Whenever possible, the same reference numerals will be used throughout the drawings to refer to the same or like parts.

Figure 1:
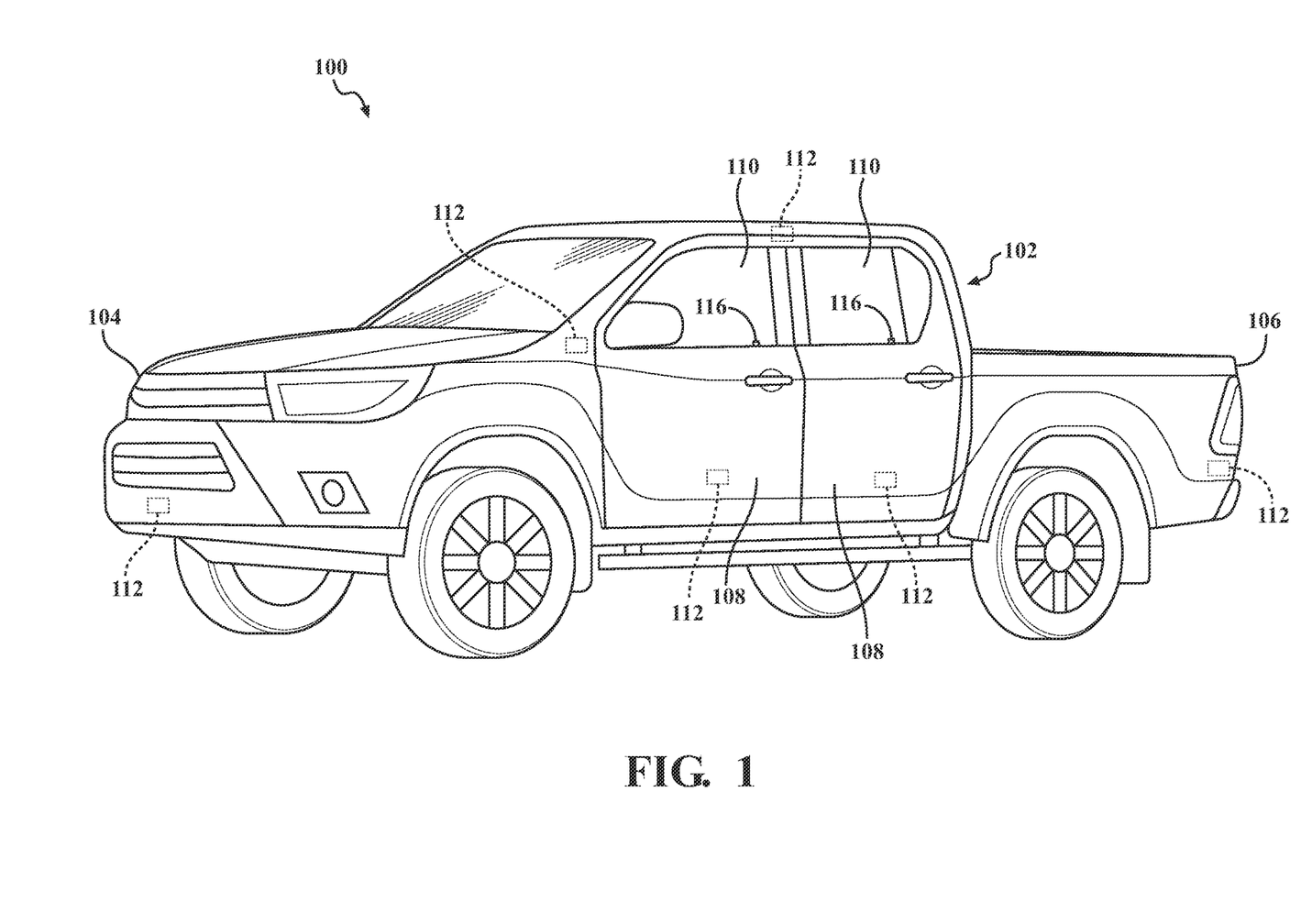
FIG. 1 schematically depicts a perspective view of a vehicle, according to one or more embodiments shown and described herein.

Referring now to FIG. 1, a vehicle 100 is illustrated according to one or more embodiments described herein. The vehicle 100 may generally include a vehicle body 102 having a front end 104 and an opposite rear end 106, one or more doors 108, and one or more windows 110. As the vehicle 100 illustrated in FIG. 1 and discussed herein is depicted as a pickup truck, it should be appreciated that the vehicle 100 may be any suitable vehicle such as, for example, a sedan, van, and the like.

In embodiments, the vehicle 100 includes one or more sensors 112 for capturing data of activity around the vehicle 100, such as audio and/or visual data, utilized to detect an unauthorized event around the vehicle 100, as described in more detail herein. As shown in FIG. 1, a plurality of sensors 112 are provided on the vehicle 100. In embodiments, the sensors 112 may be provided at the front end 104 of the vehicle body 102, the rear end 106 of the vehicle body 102, on one of the doors 108 of the vehicle 100, and/or any other suitable location of the vehicle 100. The sensors 112 may include one or more cameras, such as a front camera, rear camera, right side camera, left side camera, interior camera, exterior camera, driver monitor camera, trailer camera, bed camera, blind spot camera, and the like, intrusion sensor, temperature sensors, proximity sensors, pressure sensors, photoelectric sensors, particle sensors, motion sensors, tilt sensors, infrared sensors, ultrasonic sensors, light sensors, sonar sensors, and the like, or a combination thereof.

As discussed in more detail herein, the sensors 112 are configured to detect the unauthorized event exterior of the vehicle 100. As referred to herein, "unauthorized event" may refer to, for example, contact with the vehicle body 102, a person entering within a predetermined proximity of the vehicle 100, a person standing within a predetermined proximity of the vehicle 100 in excess of a predetermined period of time, a person peering through the windows 110 of the vehicle 100, a person reaching through a window 110 or a bed of the vehicle 100, attempting to open a door 108 of the vehicle 100, and the like.

The sensors 112 may also be configured to distinguish between two or more levels of an unauthorized event such as, for example, a first level unauthorized event and a second unauthorized event. The first level unauthorized event may be satisfied when certain activity is detected by the sensors 112 such as, but not limited to, the specific examples discussed herein. The second level unauthorized event may be satisfied when more severe activity is detected such as, for example, breaking of a window 110 of the vehicle 100, or when it is determined that the first level unauthorized event is detected for a period of time exceeding a predetermined period of time. As discussed in more detail herein, the first level unauthorized activity may cause an alarm device 114 (FIG. 4) of the vehicle 100 to operate in a deterrent mode, while the second level unauthorized activity may cause the alarm device 114 of the vehicle 100 to operate in a normal mode.

In embodiments, the vehicle 100 includes powered door locks 116 for locking respective doors 108 of the vehicle 100. Particularly, the powered door locks 116 are positionable between a locked position, in which the powered door locks 116 prevent a corresponding door 108 from being opened, and an unlocked position, in which the powered door locks 116 permit a corresponding door 108 to be opened. The powered door locks 116 may be positionable between the locked position and the unlocked position in response to operation of the vehicle 100 and/or a remote entry device. For example, in response to determining that the engine or motor of the vehicle 100 is stopped or the vehicle 100 is put into park, the powered door locks 116 may be positioned into the unlocked position. As another example, in response to determining that the vehicle 100 is put into a driving gear, such as drive or reverse, the powered door locks 116 may be positioned into the locked position. As discussed in more detail herein, the powered door locks 116 may be operated in response to the alarm device 114 of the vehicle 100 operating in the deterrent mode and, in some embodiments, in the normal mode as well.

Figure 2:
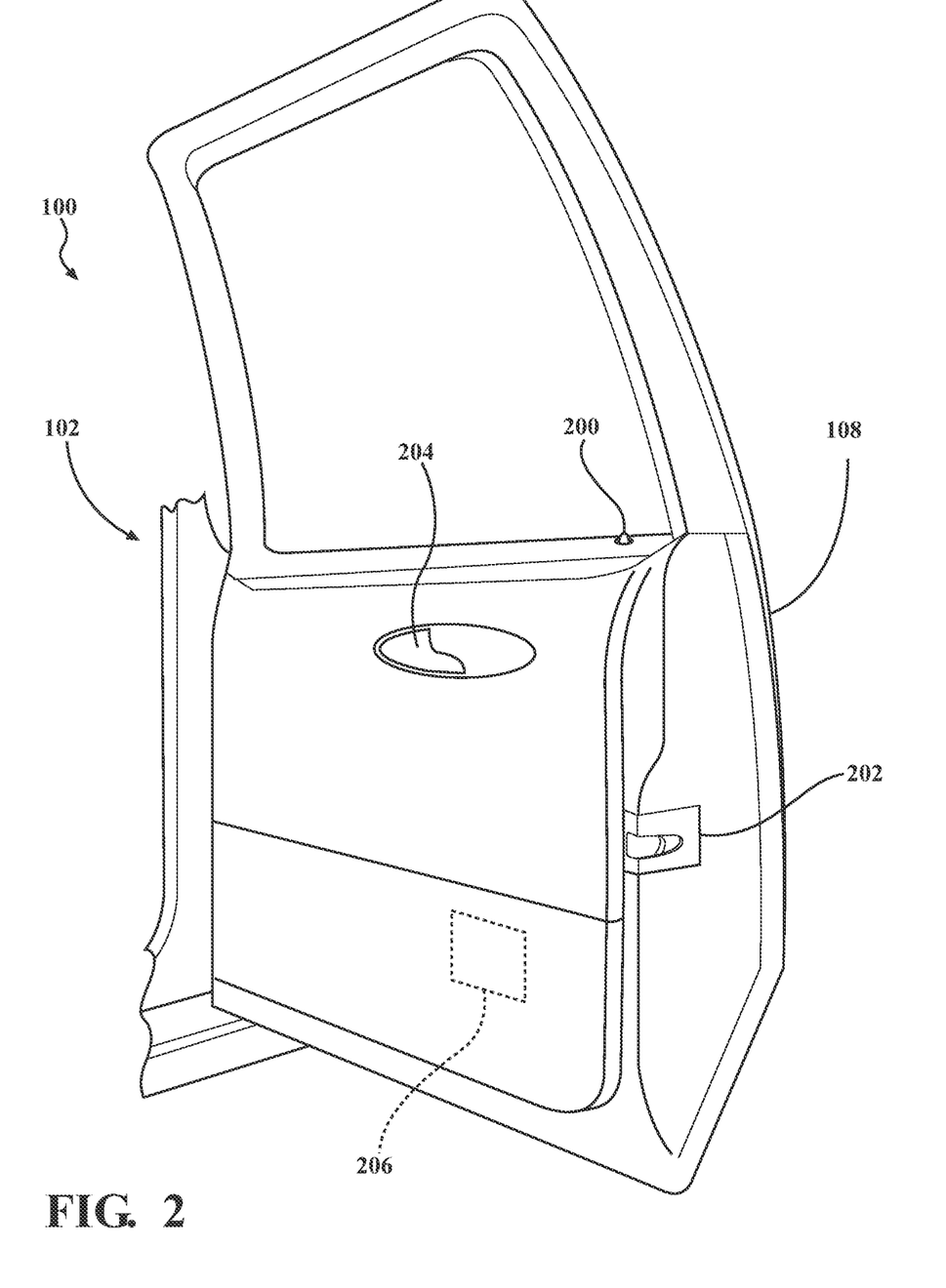
FIG. 2 schematically depicts a front view of a door of the vehicle of FIG. 1 including powered door locks, according to one or more embodiments shown and described herein.

Referring now to FIG. 2, a door 108 of the vehicle 100 is illustrated including a corresponding powered door lock 116. As shown, the door 108 may include a door lock pull pin 200, a door lock latch 202, and an interior door handle 204 operatively connected to the door lock pull pin 200 and the door lock latch 202. The door lock pull pin 200 and the door lock latch 202 are each positionable between a locked position and an unlocked position. Operation of the interior door handle 204 when the door lock pull pin 200 and the door lock latch 202 are each in the unlocked position permits the door 108 to be opened. However, one or both of the door lock pull pin 200 and the door lock latch 202 being in the locked position may inhibit the interior door handle 204 from opening the door 108.

The door 108 also includes a motor 206 configured to position one or both of the door lock pull pin 200 and the door lock latch 202 in either the locked position and the unlocked position. Additionally, the motor 206 may be configured to position the door lock pull pin 200 and the door lock latch 202 to repeatedly move the door lock pull pin 200 and/or the door lock latch 202 into or re-engage the locked position without moving into the unlocked position. As discussed herein, this creates an audible re-locking effect of the doors 108 without the doors 108 becoming temporarily unlocked. It should be appreciated that this audible re-locking effect may provide a deterrent to a person committing the unauthorized event, especially when there are changes in the speed of the audible re-locking effect, as discussed in more detail herein. Throughout the ensuing description, it should be appreciated that reference to the powered door locks 116 may refer to either of the door lock pull pin 200 and the door lock latch 202. As discussed in more detail herein, the motor 206 may be configured to move the powered door locks 116 in a predetermined pattern based on speed in response to the one or more sensors 112 detecting an unauthorized event around the vehicle 100. As referred to herein, "speed" refers to a time interval between operation of the powered door locks 116 by the motor 200. For example, a fast speed refers to shorter time intervals between operation of the powered door locks 116 as opposed to a slower speed which provides longer time intervals between operation of the powered door locks 116.

Figure 3A:
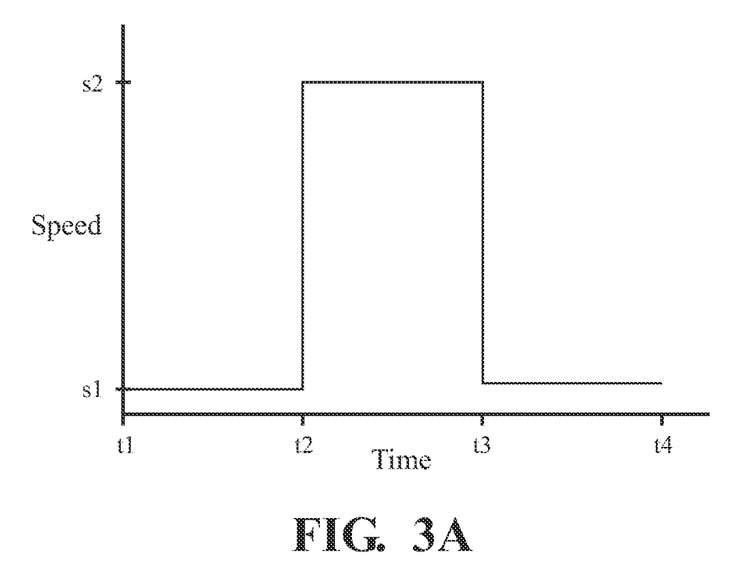
FIG. 3A depicts a graph indicating an example change in speed of the powered door locks based on time, according to one or more embodiments shown and described herein.

For example, the predetermined pattern may include the powered door locks 116 alternating between re-engaging the locked position a plurality of times at a first speed and subsequently re-engaging the locked position a plurality of times at a second speed different from the first speed. Referring now to FIG. 3A, the powered door locks 116 initially re-engage the locked position at a first speed S1 a plurality of times for a predetermined period of time between a first time t1 and a second time t2. After the second time t2, the powered door locks 116 re-engage the locked position at a second speed S2 a plurality of times for a predetermined period of time between the second time t2 and a third time t3. The second speed S2 is greater than the first speed S1. Thereafter, the powered door locks 116 re-engage the locked position at third speed a plurality of times for a predetermined period of time between the third time t3 and a fourth time t4. The third speed may be the same as the first speed S1 or a different speed, such as greater or less than the second speed S2. In embodiments, it should be appreciated that the speed of the powered door locks 116 may start at the second speed S2 subsequently alternate between the second speed S2 and the first speed S1.

Figure 3B:
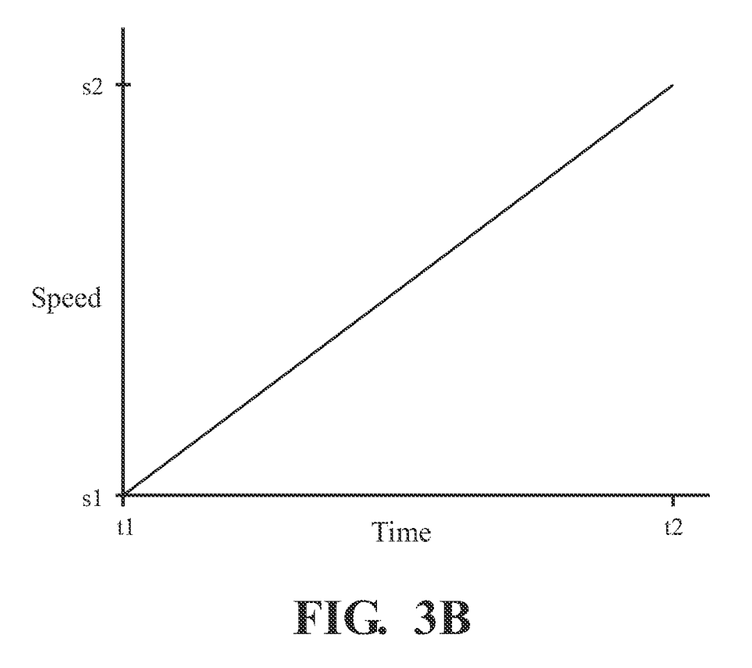
FIG. 3B depicts a graph indicating another example change in speed of the powered door locks based on time, according to one or more embodiments shown and described herein.

As another example, the predetermined pattern may include the powered door locks 116 increasing in speed at a constant rate. Referring now to FIG. 3B, the powered door locks 116 re-engage the locked position at a first speed S1 at a first time t1 and gradually increase to a second speed S2 at a second time t2. The second speed S2 is greater than the first speed S1. In embodiments, the second speed S2 may be less than the first speed S1. As such, the speed at which the powered door locks 116 re-engage the locked position may gradually decrease between time the first time t1 and the second time t2.

Figure 3C:
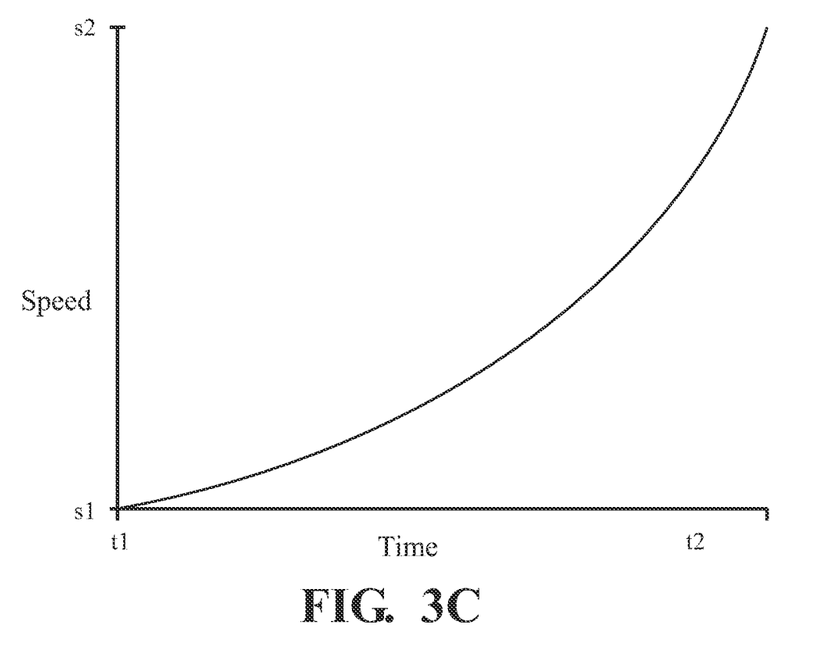
FIG. 3C depicts a graph indicating another example change in speed of the powered door locks based on time, according to one or more embodiments shown and described herein.

As another example, the predetermined pattern may include the powered door locks 116 increasing in speed at an increasing or decreasing rate. Referring now to FIG. 3C, the powered door locks 116 re-engage the locked position at a first speed S1 at a first time t1 and gradually increase to a second speed S2 at a second time t2. However, contrary to the example discussed herein illustrated in FIG. 3B, the speed of the powered door locks 116 re-engaging the locked position increases exponentially over time. In embodiments, the speed of the powered door locks 116 re-engaging the locked position may increase over time at a decreasing rate to eventually plateau at a top speed. In embodiments, second speed S2 may be less than the first speed S1. As such, the powered door locks 116 re-engage the locked position at a decreasing speed over time at either an increasing or decreasing rate.

Figure 3D:
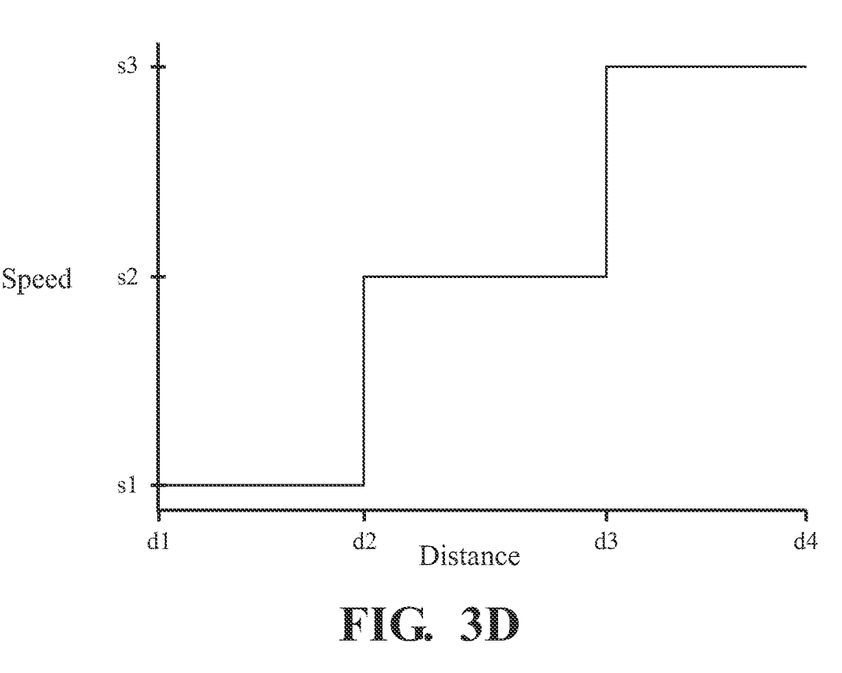
FIG. 3D depicts a graph indicating an example change in speed of the powered door locks based on distance of an object to the vehicle, according to one or more embodiments shown and described herein.

As another example, the predetermined pattern may include the powered door locks 116 increasing in speed based on a detected distance between an object of the unauthorized event and the vehicle 100. Referring now to FIG. 3D, the powered door locks 116 initially re-engage the locked position at a first speed S1 a plurality of times while the object is within a predetermined distance between d1 and d2 of the vehicle 100. The powered door locks 116 re-engage the locked position at a second speed S2 a plurality of times while the object is within a predetermined distance between d2 and d3 of the vehicle 100. The second speed S2 is greater than the first speed S1. The powered door locks 116 re-engage the locked position at a third speed S3 a plurality of times while the object is within a predetermined distance between d3 and d4 of the vehicle 100. The third speed S3 is greater than the second speed S2. As such, the speed of the powered door locks 116 re-engaging the locked position increases incrementally as the object moves closer to the vehicle 100.

In embodiments, the change in speed of the powered door locks 116 may increase at a constant rate, an increasing rate, or a decreasing rate, as opposed to the above incremental changes in speed, based on the distance between the object of the unauthorized event and the vehicle 100 decreasing. In embodiments, the change in speed of the powered door locks 116 may decrease, rather than increase, at an incremental rate, a constant rate, an increasing rate, or a decreasing rate based on the distance between the object of the unauthorized event and the vehicle 100 decreasing.

Figure 4:
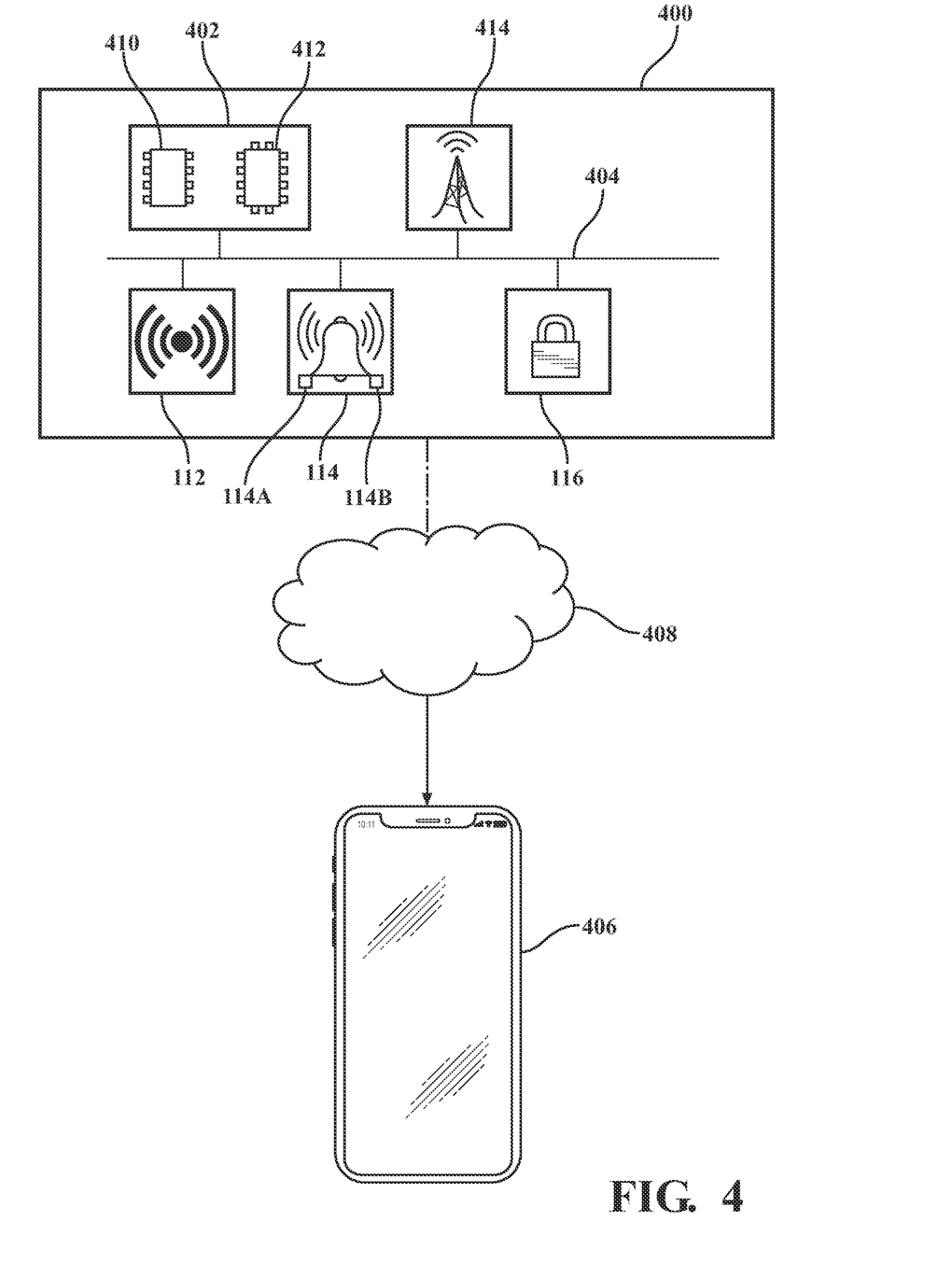
FIG. 4 schematically depicts a vehicle system of the vehicle of FIG. 1, according to one or more embodiments shown and described herein.

Referring now to FIG. 4, components of a vehicle system 400 are schematically depicted. In embodiments, the vehicle system 400 includes a controller 402, such as an electronic control unit, a communication path 404, the one or more sensors 112, the alarm device 114, and the powered door locks 116. However, it should be noted that, in embodiments, the vehicle system 400 may not include each of the various components discussed herein.

In embodiments, the vehicle system 400 may communicate with a mobile device 406, such as a smart phone or the like, via a network 408. As such, information pertaining to the unauthorized event around the vehicle 100 may be provided on a display screen of the mobile device 406. In addition, the alarm device 114 may be remotely controlled, such as to deactivate the alarm device 114, by operating the mobile device 406 and sending instruction to the vehicle system 400 via the network 408.

As noted above, the vehicle system 400 includes the communication path 404. The communication path 404 may be formed from any medium that is capable of transmitting a signal such as, for example, conductive wires, conductive traces, optical waveguides, or the like. Moreover, the communication path 404 may be formed from a combination of mediums capable of transmitting signals. In one embodiment, the communication path 404 includes a combination of conductive traces, conductive wires, connectors, and buses that cooperate to permit the transmission of electrical data signals to components such as processors, memories, sensors, input devices, output devices, and communication devices. Accordingly, the communication path 404 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 404 communicatively couples the various components of the vehicle system 400. As used herein, the term "communicatively coupled" means that coupled components are capable of exchanging data signals with one another such as, for example, electrical signals via conductive medium, electromagnetic signals via air, optical signals via optical waveguides, and the like.

As noted above, the vehicle system 400 includes the controller 402 including one or more processors 410 and one or more memory modules 412. Each of the one or more processors 410 may be any device capable of executing machine readable instructions. Accordingly, each of the one or more processors 410 may be an integrated circuit, a microchip, a computer, or any other computing device. The one or more processors 410 are communicatively coupled to the other components of the vehicle system 400 by the communication path 404. Accordingly, the communication path 404 may communicatively couple any number of processors with one another, and allow the modules coupled to the communication path 404 to operate in a distributed computing environment. Specifically, each of the modules may operate as a node that may send and/or receive data.

Each of the one or more memory modules 412 of the vehicle system 400 is coupled to the communication path 404 and communicatively coupled to the one or more processors 410. The one or more memory modules 412 may include RAM, ROM, flash memories, hard drives, or any device capable of storing machine readable instructions such that the machine readable instructions may be accessed and executed by the one or more processors 410. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 412. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The vehicle system 400 includes network interface hardware 414 for communicatively coupling the vehicle system 400 to the mobile device 406 via the network 408. The network interface hardware 414 can be communicatively coupled to the communication path 404 and can be any device capable of transmitting and/or receiving data via the network 408. Accordingly, the network interface hardware 414 can include a communication transceiver for sending and/or receiving any wired or wireless communication. For example, the network interface hardware 414 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 414 includes hardware configured to operate in accordance with the Bluetooth® wireless communication protocol.

The alarm device 114 may include or be configured to control any number of vehicle components to be activated during an alarm event such as, for example, a horn, lights, a display device, and the like, as well as the motor 206 of the powered door locks 116. As such, the alarm device 114 may include an audio output unit 114A configured to output audio, such as the horn, and/or a visual output unit 114B configured to output a visual output, such as the lights or a display device. As discussed herein, the alarm device 114 may be operated in a deterrent mode and a normal mode based on the unauthorized event being determined to be a first level unauthorized event or a second level unauthorized event, respectively. In the deterrent mode, the alarm device 114 is operated performs a first set of alarm actions. In the normal mode, the alarm device 114 is operated to perform a second set of alarm actions different from the first set of alarm actions. For example, the first set of alarm actions may include the powered door locks 116 operating in accordance with the predetermined pattern discussed herein. The second set of alarm actions may include the addition of other actions by, for example, the horn, lights, or the like. The second set of alarm conditions may also include the discontinuation of the powered door locks 116 operating in accordance with the predetermined pattern. Alternatively, the second set of alarm actions may include the powered door locks 116 operating in accordance with a predetermined pattern different from the predetermined pattern utilized during the first set of alarm actions. In other embodiments, the predetermined pattern utilized during the second set of alarm actions may be the same as the predetermined pattern utilized during the first set of alarm actions Referring now to FIG. 5, a flowchart is depicted indicating a method 500 for operating the alarm device 114 in response to the controller 402 detecting an unauthorized event and operating the powered door locks 116 accordingly, as discussed herein. At step 502, the sensors 112 capture data of activity around the vehicle 100 and the controller 402 processes the data to determine whether an unauthorized event has been detected above a first threshold, e.g., a first level unauthorized event or a second level unauthorized event. As referred to herein, the first threshold may be measured by a distance to an unauthorized person and/or object, an amount of force applied against the vehicle 100, and the like. It should be appreciated that when the unauthorized event is not above the first threshold, the method 500 does not proceed any further and the alarm device 114 does not operate in either the deterrent mode or the normal mode. However, if the unauthorized event is above the first threshold, the method 500 proceeds to step 502. At step 502, a determination is made by the controller 402 as to whether the unauthorized event exceeds a second threshold greater than the first threshold so as to be classified as a second level unauthorized event. For example, the second threshold may be satisfied when a distance to the unauthorized person and/or object is within a predetermined distance to the vehicle 100, or an amount of force applied against the vehicle 100 exceeds a predetermined threshold. Other non-limiting examples of first level unauthorized events and second level unauthorized events are described in greater detail herein.

Figure 5:
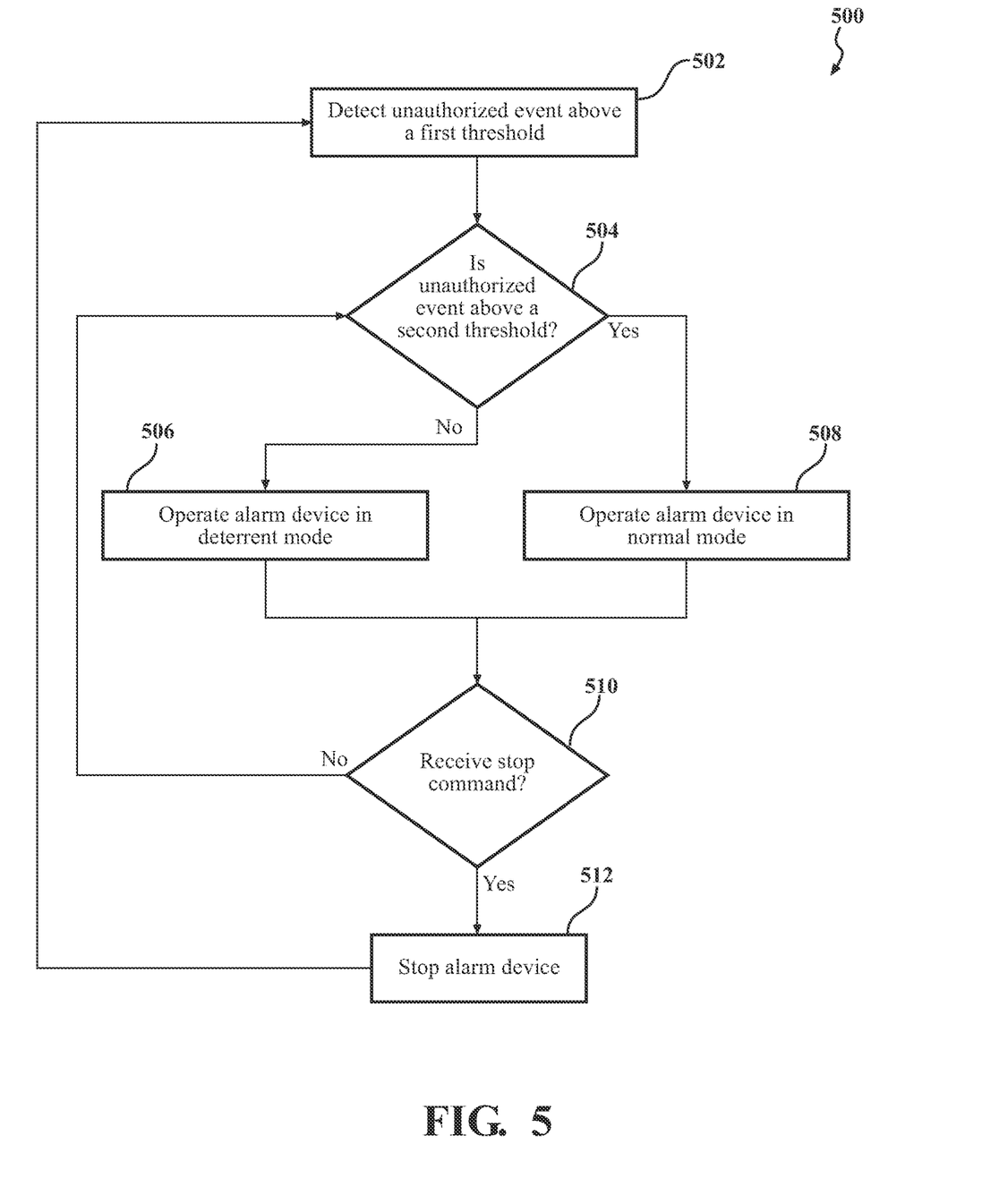
FIG. 5 depicts a flowchart of a method for activating an alarm device of the vehicle of FIG. 1, according to one or more embodiments shown and described herein.

When it is determined at step 504 that the unauthorized event does not exceed the second threshold, e.g., the unauthorized event is a first level unauthorized event, the method 500 proceeds to step 506. Accordingly, at step 506, the alarm device 114 operates in the deterrent mode and controls the vehicle components in accordance with the first set of alarm actions. As discussed herein, the first set of alarm actions includes, but is not limited to, the powered door locks 116 operating in accordance with a predetermined pattern.

Alternatively, if it is determined at step 504 that the unauthorized event does exceed the second threshold, e.g., the unauthorized event is a second level unauthorized event, the method 500 proceeds to step 508. Accordingly, at step 508, the alarm device 114 operates in the normal mode and controls the vehicle components in accordance with the second set of alarm actions. As discussed herein, the second set of alarm actions includes, but is not limited to, the horn, the lights, and other components of the vehicle 100, and may further include the powered door locks 116 operating in accordance with a predetermined pattern. The predetermined pattern may be the same or different from the predetermined pattern during the first set of alarm actions. As such, it should be appreciated that, when in the normal mode, the powered door locks 116 may still be operated in accordance with the same or a different predetermined pattern as exhibited when operating in the deterrent mode. However, one or more other vehicle components are activated by the alarm device 114 as well during the normal mode to provide a different set of alarm actions.

After the alarm device 114 is operated in either the deterrent mode or the normal mode, the method 500 proceeds to step 510 at which the vehicle system 400, specifically the controller 402, determines whether a stop command has been received. In embodiments, the stop command may be sent from the mobile device 406. In other embodiments, the stop command may be received and detected by the controller 402 automatically in response to the alarm device 114 operating in excess of a predetermined period of time. If it is determined that the stop command has not been received, the method 500 returns to step 504 to continue determining whether the unauthorized event is above the second threshold. This allows the alarm device 114 to transition from operating in the deterrent mode to the normal mode in response to determining that the unauthorized event is now a second level unauthorized event or, alternatively, transition to the deterrent mode from the normal mode in response to determining that the unauthorized event is now a first level unauthorized event. Alternatively, if it is determined by the controller 402 that the stop command is received at step 510, the method 500 proceeds to step 512 at which the controller 402 instructs the vehicle components, such as the powered door locks 116, to stop operating. The method 500 then returns to step 502 to continue monitoring for an unauthorized event.

From the above, it is to be appreciated that defined herein is a vehicle including an alarm device configured to operate a vehicle component, such as powered door locks, in a predetermined pattern based on speed in response to detecting an unauthorized event.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    powered door locks;
    a motor for positioning the powered door locks between a locked position and an unlocked position;
    a sensor configured to capture data of activity around the vehicle; and
    an electronic control unit configured to:
        process the data captured by the sensor to detect an unauthorized event around the vehicle; and
        operate the motor to repeatedly re-engage the powered door locks into the locked position in a predetermined pattern based on speed in response to detecting an unauthorized event around the vehicle without moving the powered door locks into the unlocked position.

2. The vehicle of claim 1, wherein the electronic control unit is configured to:
    operate an alarm device of the vehicle in a deterrent mode in response to determining that the unauthorized event exceeds a first threshold; and
    operate the alarm device of the vehicle in a normal mode in response to determining that the unauthorized event exceeds a second threshold.

3. The vehicle of claim 2, wherein activating the alarm device in the deterrent mode includes performing a first set of alarm actions, the first set of alarm actions including operating the motor in the predetermined pattern.

4. The vehicle of claim 3, wherein operating the alarm device in the normal mode includes performing a second set of alarm actions, the second set of alarm actions being different from the first set of alarm actions.

5. The vehicle of claim 4, wherein the second set of alarm actions includes activating at least one of a horn of the vehicle and a plurality of lights of the vehicle.

6. The vehicle of claim 1, wherein the predetermined pattern based on speed comprises:
    operating the motor to re-engage the powered door locks into the locked position a plurality of times at a first speed;
    subsequently operating the motor to re-engage the powered door locks into the locked position a plurality of times at a second speed different than the first speed; and
    subsequently operating the motor to re-engage the powered door locks into the locked subsequently operating the motor to re-engage the powered door locks into the locked position a plurality of times at the first speed.

7. The vehicle of claim 1, wherein the predetermined pattern based on speed comprises:
    operating the motor to move the powered door locks into the locked position a plurality of times at an increasing speed based on at least one of an elapsed time since a detection of the unauthorized event, and a decrease in proximity to an object detected during the unauthorized event.

8. An electronic control unit of a vehicle configured to:
    process data captured by a sensor to detect an unauthorized event around the vehicle; and
    operate a motor of the vehicle to repeatedly re-engage powered door locks of the vehicle into a locked position in a predetermined pattern based on speed in response to detecting the unauthorized event around the vehicle without moving the powered door locks into an unlocked position.

9. The electronic control unit of claim 8, wherein the electronic control unit is configured to:
    send a first signal to operate an alarm device of the vehicle in a deterrent mode in response to determining that the unauthorized event exceeds a first threshold; and
    send a second signal to operate the alarm device of the vehicle in a normal mode in response to determining that the unauthorized event exceeds a second threshold.

10. The electronic control unit of claim 9, wherein the first signal includes instruction to operate the alarm device in the deterrent mode to perform a first set of alarm actions, the first set of alarm actions including operating the motor in the predetermined pattern.

11. The electronic control unit of claim 10, wherein the second signal includes instruction to operate the alarm device in the normal mode to perform a second set of alarm actions, the second set of alarm actions being different from the first set of alarm actions.

12. The electronic control unit of claim 11, wherein the second set of alarm actions includes activation of at least one of a horn of the vehicle and a plurality of lights of the vehicle.

13. The electronic control unit of claim 8, the predetermined pattern based on speed comprises:
    operating the motor to re-engage the powered door locks into the locked position a plurality of times at a first speed;
    subsequently operating the motor to re-engage the powered door locks into the locked position a plurality of times at a second speed different than the first speed; and
    subsequently operating the motor to re-engage the powered door locks into the locked subsequently operating the motor to re-engage the powered door locks into the locked position a plurality of times at the first speed.

14. The electronic control unit of claim 8, wherein the predetermined pattern based on speed comprises:
    operating the motor to re-engage the powered door locks the locked position a plurality of times at an increasing speed based on at least one of an elapsed time since a detection of the unauthorized event, and a decrease in proximity to an object detected during the unauthorized event.

15. A method comprising:
    processing data captured by a sensor;
    detecting an unauthorized event around a vehicle based on the processed data captured by the sensor; and
    in response to detecting the unauthorized event around the vehicle, an electronic control unit operating a motor to repeatedly re-engage powered door locks into a locked position in a predetermined pattern based on speed without moving the powered door locks into an unlocked position.

16. The method of claim 15, further comprising:
    activating an alarm device of the vehicle in a deterrent mode in response to determining that the unauthorized event exceeds a first threshold; and activating the alarm device of the vehicle in a normal mode in response to determining that the unauthorized event exceeds a second threshold.

17. The method of claim 16, wherein activating the alarm device in the deterrent mode includes performing a first set of alarm actions, the first set of alarm actions including operating the motor in the predetermined pattern.

18. The method of claim 17, wherein operating the alarm device in the normal mode includes performing a second set of alarm actions, the second set of alarm actions being different from the first set of alarm actions.

19. The method of claim 15, wherein the predetermined pattern based on speed comprises:
  operating the motor to re-engage the powered door locks into the locked position a plurality of times at a first speed;
  subsequently operating the motor to re-engage the powered door locks into the locked position a plurality of times at a second speed different than the first speed; and
  subsequently operating the motor to re-engage the powered door locks into the locked position a plurality of times at the first speed.

20. The method of claim 15, wherein the predetermined pattern based on speed comprises:
  operating the motor to re-engage the powered door locks into the locked position a plurality of times at an increasing speed based on at least one of an elapsed time since a detection of the unauthorized event, and a decrease in proximity to an object detected during the unauthorized event.

\* \* \* \* \*

UNITED STATES PATENT AND TRADEMARK OFFICE
CERTIFICATE OF CORRECTION

| | |
|---|---|
| PATENT NO. | : 11,794,691 B2 |
| APPLICATION NO. | : 17/494403 |
| DATED | : October 24, 2023 |
| INVENTOR(S) | : Clinton Williams and Alexander L. Paradis |

It is certified that error appears in the above-identified patent and that said Letters Patent is hereby corrected as shown below:

On the Title Page

Column 2, item (56), other publications, cite no. 1, delete "(https://www tesla.com/blog/sentry-modeguarding-your-tesla)" and insert --(https://www.tesla.com/blog/sentry-modeguarding-your-tesla)--, therefor.

In the Specification

In Column 7, Line(s) 46, after "actions", insert --.--.

In the Claims

In Column 9, Line(s) 56 - 59, Claim 6, delete "subsequently operating the motor to re-engage the powered door locks into the locked subsequently operating the motor to re-engage the powered door locks into the locked" and insert --subsequently operating the motor to re-engage the powered door locks into the locked--, therefor.

Signed and Sealed this
Twenty-eighth Day of May, 2024

Katherine Kelly Vidal
*Director of the United States Patent and Trademark Office*